R. Cook,
Water Wheel,
№ 3,740, Patented Sept. 14, 1844.

UNITED STATES PATENT OFFICE.

ROSWELL COOK, OF ELKLAND, PENNSYLVANIA.

IMPROVEMENT IN WATER-WHEELS.

Specification forming part of Letters Patent No. 3,740, dated September 14, 1844.

*To all whom it may concern:*

Be it known that I, ROSWELL COOK, of Elkland, Tioga county, State of Pennsylvania, have invented new and useful Improvements in Reaction Water-Wheels, which are described as follows, reference being had to the annexed drawings of the same, making part of this specification.

Figure 1:
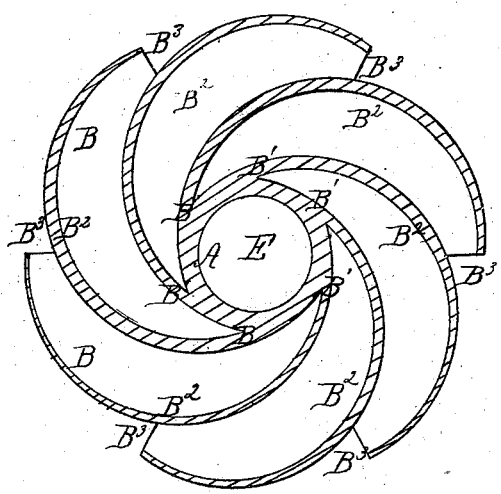
Figure 2:
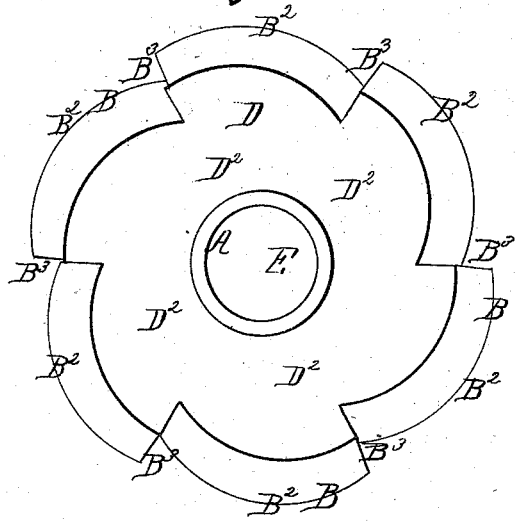

Figure 1 is a view of the top of the spiral-bucket water-wheel. Fig. 2 is a view of the under side of said wheel. Fig. 3 is a top view of the shell-bucket wheel. Fig. 4 is a view of the under side of the same.

The hub A of the spiral-bucket wheel is made cylindrical and hollow. The buckets B start from the top of the hub A at the circumference thereof, diverging from it at B' in a spiral manner to the middle of the bucket at $B^2$, from which point it gradually approaches the next succeeding bucket till within such distance as is requisite to form a narrow issue $B^3$, descending from the upper edge of the bucket, which is on the same horizontal plane with the top of the hub at an angle of about forty-five degrees with the bottom thereof, to which it unites near the bottom of the next bucket B, forming a concave bucket resembling a crescent, the water acting on the inclined surfaces thereof and escaping through the narrow issue $B^3$, before described, causing the wheel to turn in a contrary direction to that at which the water issues therefrom. The bottom D of the wheel resembles a coarse circular saw or rag-wheel, having as many teeth as there are buckets, the outer or smaller ends of the buckets being nearly coincident with the teeth or points of said bottom plate. The said notched plate is made concave at $D^2$, where it joins the periphery of the hub, which it does above the lower end or bottom thereof. The notched portion of the plate or bottom is flat and on the same plane with the bottom of the hub. All the buckets are made, arranged, and united to the hub and bottom plate in the same manner and form buckets precisely similar.

Although for the purpose of more clearly describing the construction of the wheel separate plates are spoken of, it is nevertheless cast on a large scale in a single piece, perforated in the center, with an aperture E for the insertion of the shaft to which it is fastened.

What I claim as my invention, and which I desire to secure by Letters Patent, is—

The before-described peculiar construction of the buckets B of the wheel, as shown in Figs. 1 and 2—that is to say, starting from the top of the hub A at the circumference thereof and diverging from it at B' in a spiral manner to the middle of the bucket at $B^2$, from which point it gradually approaches the next succeeding bucket till within such distance as is requisite to form a narrow issue $B^3$, descending from the upper edge of the bucket at an angle of about forty-five degrees with the bottom thereof, to which it unites near the bottom of the next bucket.

ROSWELL COOK.

Witnesses:
ENOS SLOSSON,
I. C. WHITAKER.